Feb. 18, 1941.  J. L. KOPF  2,232,614
COFFEE MAKER
Filed June 9, 1939   2 Sheets-Sheet 1
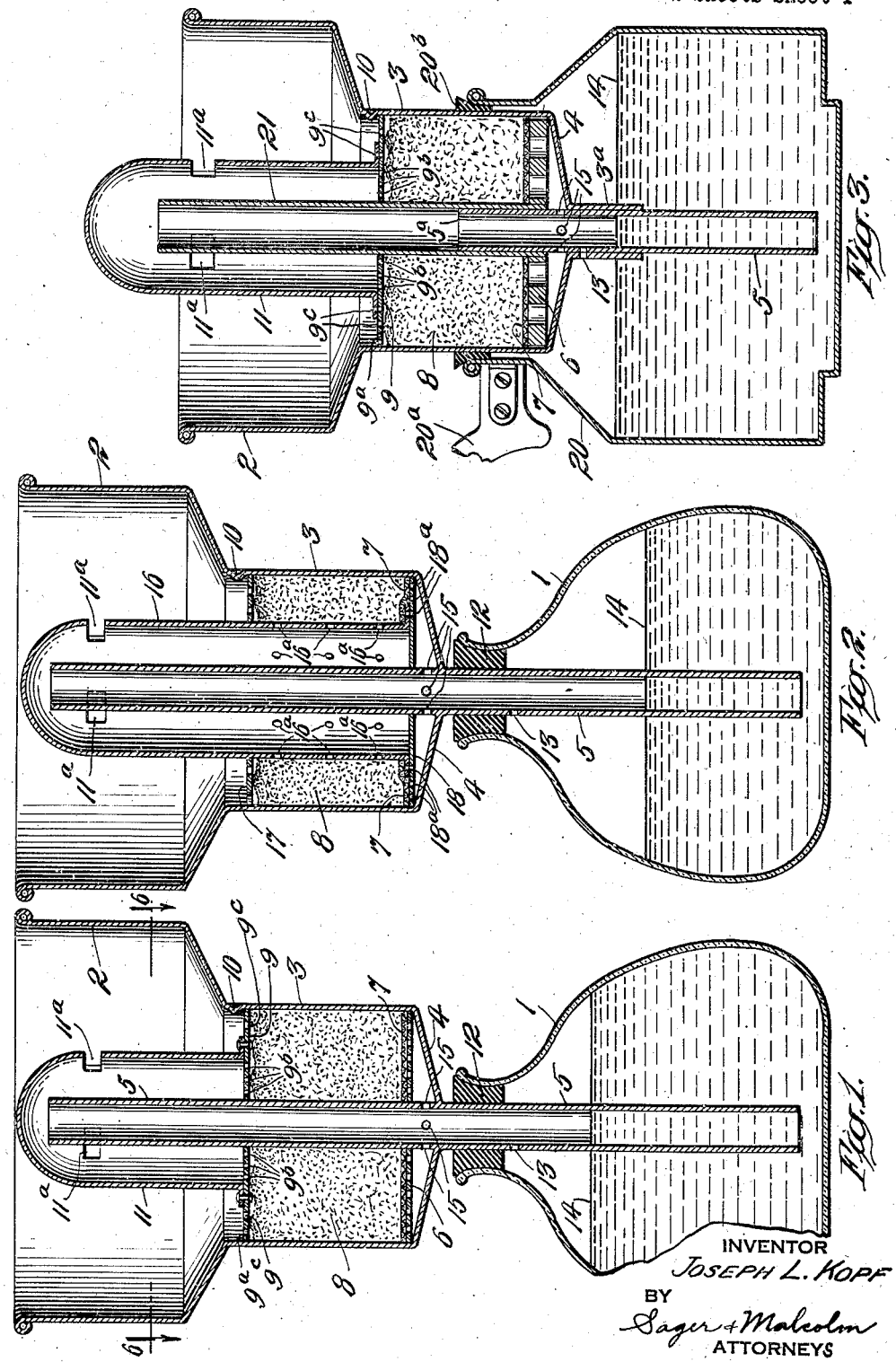
INVENTOR
JOSEPH L. KOPF
BY
Sager & Malcolm
ATTORNEYS

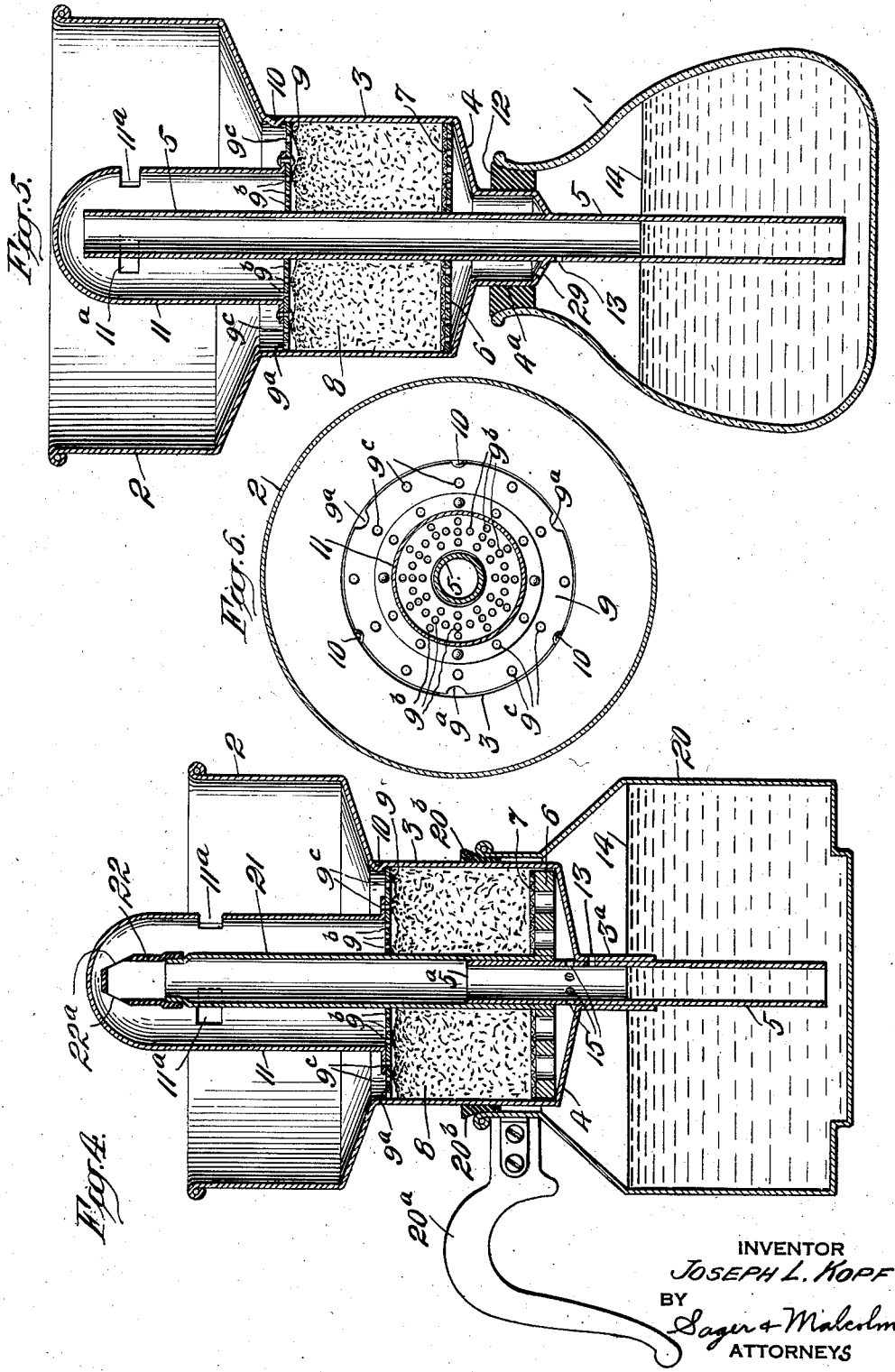

Patented Feb. 18, 1941

2,232,614

UNITED STATES PATENT OFFICE 2,232,614

COFFEE MAKER

Joseph L. Kopf, East Orange, N. J., assignor to Jabez Burns & Sons, Inc., New York, N. Y., a corporation of New York Application June 9, 1939, Serial No. 278,310

13 Claims. (Cl. 53—3)

This invention relates to an improved method and apparatus for making coffee by what is generally known as the drip method. The method is covered and claimed in my divisional pending application Serial No. 304,472, filed November 15, 1939.

In making coffee by the drip method, a mass of ground coffee is placed upon a filter plate located in the lower part of an infusion vessel, a perforated splash plate is set above the mass of coffee and water at the boiling point is poured upon it. The water then passes through the coffee mass into a vessel underneath, the extraction being effected as the liquid passes through the ground coffee.

The mass of ground coffee consists of grains or granules of various sizes, the spaces between them being occupied by a considerable quantity of gas, mainly air and carbon dioxide, about equal in volume to the actual volume of coffee. When water is poured on top of the coffee mass, this gas impedes the proper and uniform passage of the water through the mass. The result is that in some portions of the mass of coffee the water will be retarded by the gases. In other portions of the mass the water will seek the easiest paths and form its own channels; and will pass through these channels at a comparatively high rate while not passing through other portions of the mass at all. This results in poor extraction, not only on account of the lack of uniformity of action, but because some of the coffee is not subjected to any appreciable extraction. It follows that the resulting beverage is weak and lacking in proper aroma and flavor.

In order to overcome the above difficulties and in order to prepare the beverage properly with sufficient and uniform extraction from all parts of the coffee, all of the gases contained in the mass of coffee should be expelled and then the water will pass uniformly through the mass. This will result in securing uniform and efficient extraction from all parts of the coffee.

An important object of the present invention is to provide means for expelling the gases from the coffee mass and thereby insure intimate and uniform contact of the liquid with all parts of the coffee. Another object is to insure that the liquid will pass through the coffee mass at a proper rate for obtaining sufficient extraction and avoiding over-extraction. Another object is to insure that the water when coming in contact with the coffee will be at or near the boiling point. Another object is to provide an apparatus whereby uniform results, as regards quality, may be obtained repeatedly and without requiring special care and watchfulness in the process of making the beverage. Another object is to provide a simple form of apparatus for accomplishing these results and apparatus which may be conveniently assembled and dissembled. Other objects and advantages will be understood from the following description and accompanying drawings which illustrate preferred embodiments of the invention.

Fig. 1 is a vertical central section of one embodiment; Figs. 2 to 5 are similar sections of modified forms of the invention; and Fig. 6 is a horizontal section on the line 6—6 of Fig. 1.

In Fig. 1 the heating bowl or heating vessel 1 is indicated of a form similar to the usual type of vacuum coffee maker. The upper vessel 2 is the infusion vessel and is of cylindrical form having an open top to which a cover may be applied if desired. The infusion vessel is provided with a lower portion 3 of reduced diameter and a bottom sloping portion 4. This lower portion carries at its center a tube 5 which extends from near the bottom of the heating vessel to near the top of the vessel 2. A removable perforated plate 6 surrounds the tube 5 and is located in the bottom of the reduced portion 3 of the vessel and is supported at the rim of the sloping portion 4. A filter 7 of paper or filter cloth may be used with the plate 6 and the coffee mass 8 is placed above the filter. Another perforated plate 9, serving as a splash plate, surrounds the tube 5 and is positioned above the mass 8 of coffee. The plate 9 is more fully shown in Fig. 7 and is provided with equally spaced peripheral notches 9a which are adapted to pass by inwardly extending projections 10 at the upper part of the portion 3 of the infusion vessel. After passing by these projections the plate 9 is locked by turning. The plate 6 is similarly provided with peripheral notches to permit it to pass the projections 10 when inserted or removed.

A shell 11 of cylindrical form and having a dome-shaped top surrounds the upper part of the tube 5 and is of larger diameter than the tube so as to form a space or chamber between the upper portion of the tube and the shell. The shell is shown provided at its bottom with an outwardly extending flange by which it is secured to the plate 9 by any suitable means, such as welding or riveting. A number of the perforations 9b of the plate 9 are at the inner portion thereof between the shell 11 and the tube 5; and a number of the perforations 9c of the plate are in the outer portion thereof between the shell 11 and the portion 3 of the infusion vessel. In the upper portion of the shell 11 and below the top of the tube 5 a few openings 11a are formed of sufficient size to permit a free passage of water outwardly from the space or chamber enclosed by the shell after the water level therein has attained the level of these openings.

A seal 12 of rubber, or other suitable material, is positioned between the upper portion of the heating vessel 1 and the tube 5 to form a tight joint between the tube and the heating vessel. A small distance below the seal 12, a small opening 13 is formed in the tube 5; and this opening is above the normal water level 14 when a desired amount of water is placed in the heating vessel in preparation for making the beverage. A few openings 15 of comparatively small size are former in the tube below the perforated plate 6 and above the bottom portion 4 of the heating vessel. The number and size of these openings depend upon the capacity of the apparatus; and their size may be used to determine the permissible rate of return of the beverage from the infusion vessel to the heating vessel, particularly in large capacity devices.

In operation, the infusion vessel and tube 5 being removed, the desired amount of water for making the beverage is introduced into the heating vessel 1. The proper amount of ground coffee, depending upon the amount of the beverage to be made and the desired strength of the beverage, is placed on the plate 6 and filter 7, the shell 11 and plate 9 having first been removed. The shell and plate 9 are then placed over the tube 5 and over the coffee mass and turned so that the notches 9a are out of line with the projections 10. The infusion unit is then joined to the heating unit, the seal 12 serving to form a tight joint between the parts. Heat is then applied to the heating vessel. If the water introduced in the heating vessel is cold, or of moderate temperature, then the expansion of the water and of the air and vapor in the upper part of the heating vessel will cause a slight increase of pressure during the heating which is relieved by the opening 13 which affords a passage to atmosphere up through the tube and out through the openings 11a. This relief of pressure continues while the water is being heated and prevents the water from being forced up through the tube 5. However, when the water begins to boil, the size of the opening 13 is insufficient to relieve the rapid increase in pressure which then occurs, and the water, at boiling temperature, is forced up through the tube and passes from its top into the shell 11. The water accumulates in the space or chamber between the tube and the shell and passes downwardly through the perforations 9b due to the head of water to the portion of the coffee mass below these openings and passes outward radially through the coffee mass and expels the gases from the coffee out through the openings 9c. As the action continues, the height of the water within the chamber formed by the shell increases and exerts considerable pressure in forcing the water through the coffee and thus insures an efficient and effective expelling of the gases from the coffee mass. In the meantime a small amount of water has passed through the openings 15 into the space below the plate 6 and has moistened the portions of the coffee mass near the filter and thus may assist in expelling the gases from the coffee mass in cooperation with the pressure head of water within the shell 11.

As the water passes through the coffee from within the shell 11 and expels the gases, the water level in the shell rises because the passage of the water from the heating vessel is more rapid than the seeping of the water into the coffee mass. Thus an increasing head of water is formed in the shell which is increasingly effective in expelling the gases. When the water level has reached the openings 11a, substantially all the gases have been forced from the coffee. The water now overflows through the openings 11a and accumulates in the vessel 2 above the plate 9 and outside the shell. This action continues until most of the water has been forced out of the heating vessel. The application of heat to the vessel 1 may now be discontinued although the time of stopping the application of heat is not critical in affecting the amount of extraction and the flavor of the beverage because the water cannot pass down through the coffee mass as long as the heating is continued; and consequently the user does not need to time the discontinuance of heat carefully in order to obtain consistent results in the quality of the beverage.

After the heating is discontinued, the water passes down by gravity through the whole mass of coffee from the vessel 2 from both without and within the shell. Its time of passage is determined by the depth of the coffee mass, the character of the grind, and the type filter used such as paper, cloth or metal; and may also be determined by the number and size of the openings 15. The rate of passage of the liquid through the coffee on its way to the heating vessel determines the degree of extraction and the strength and flavor of the beverage. For any similar conditions, the time of passage of the liquid through the coffee mass will be the same for repeated making of the beverage; and proper extraction with the desired strength and aroma may be consistently obtained. The beverage may, of course, be poured from the heating vessel after removal of the upper unit with the seal 12.

In the form shown in Fig. 2, the parts are similar to those already described except the shell 16 in Fig. 2 passes through the upper perforated plate 17 and is secured to the top of the bottom perforated plate 18. The coffee mass 8 is located between the outer portions of the upper and lower perforated plates and between the outside of the shell 16 and the reduced portion 3 of the infusion vessel. The lower perforated plate 18 extends inwardly to the tube 5 but there are no perforations in the inner part of this plate, the perforations 18a being formed only in that portion of the plate below the coffee mass. The shell 16 is provided with perforations 16a in the lower portion of the shell opposite the coffee mass and between the perforated plates. The operation is similar to that described with reference to Fig. 1 except that the water which first accumulates within the shell will pass out through the openings 16a into the coffee mass and expel gases by forcing them upwardly through the perforations in the upper plate 17. The space available for the coffee in Fig. 2 is less than that shown in the form of Fig. 1 and therefore a smaller amount of water would be used for obtaining the same strength of the beverage in the form of Fig. 2 than would be used in the form of Fig. 1, as indicated by the lower water level in Fig. 2.

The form shown in Fig. 3 is similar generally to the form shown in Fig. 1. The heating vessel 20 is shown of different form and has a wide open top portion and a handle 20a is shown for convenient handling. A gasket 20b is interposed between the lower portion 3 of the infusion vessel and the top of the vessel 20 for securing a tight joint when the parts are assembled. The lower end 3a of the infusion vessel envelops a portion of the tube 5 and is fixed thereto by friction or in other ways or it may be formed integral therewith as in Fig. 1. The tube 5 in Fig. 3 instead of being carried to near the top of the shell terminates at 5a, a short distance above the lower perforated plate 6. Another tube 21 embraces the top portion of the tube 5 with a slidable fit and extends to near the top of the shell 11. The lower end of the tube 21 is fixed to the perforated plate 6 by welding or other suitable means. This form of construction is particularly convenient in assembling and dissembling the apparatus, the perforated plate 9 being attached to the shell is removable therewith and the perforated plate 6 is removable with the tube 21. The operation is similar to that described with reference to Fig. 1.

Fig. 4 is the same as Fig. 3 except at the upper end of the tube 21 which is substantially a continuation of the tube 5, is secured a one-way valve 22 which permits free passage of the water from the top of tube 21 to the shell 11 but closes against the passage of air into the tube. This valve may be in the form of a rubber thimble with opposite upper portions cut off as indicated at 22a. The valve opens to permit the free passage of water into the shell; but closes against the passage of air into the tube by the sides of the rubber thimble below the openings coming close together. The operation is similar to that already described except after the withdrawal of heat from the heating vessel, a vacuum is formed in the heating vessel which serves to aid in the passage of the liquid downwardly through the coffee mass by reason of the air pressure on the liquid in the vessel 2 and in the shell 11 being greater than the pressure within the heating vessel, the valve 22 being closed during this time. Any other suitable form of one-way valve may be used at the top of the tube 21. Likewise this valve could be applied to the top of the central tube in any other of the forms shown. The use of this valve is advantageous in some forms of apparatus particularly of large capacity.

Fig. 5 is the same as Fig. 1 except the openings 15 below the lower filter plate 6 are absent and the inclined portion 4 of the infusion vessel is provided with a lower cylindrical extension 4a which surrounds and is spaced from the tube 5 and passes down through the seal 12 and then joins with the tube 5. One or more openings 29 are formed in the lower portion of the extension 4a. The operation is similar to that already described with reference to Fig. 1 except that water from the tube 5 cannot pass over the inclined portion 4 of the infusion vessel while the water is being forced up through the tube 5. During the infusion period when the liquid is passing down through the coffee mass, the beverage returns to the heating vessel through the opening or openings 29. The size and number of the openings 29 may determine the permissible maximum rate of return of the beverage to the heating vessel and thereby control the timing and degree of extraction for securing the most desirable cup quality.

Each of the forms shown may be made of glass or of suitable metals which may be plated with any desired metal coating.

Although several different embodiments of the invention have been disclosed, various modifications may be made without departing from the scope of the invention. Although the invention has been described particularly with reference to the making of coffee, the invention is applicable to the making of other beverages and the claims are understood to cover the apparatus when applied to the making of other beverages.

I claim:

1. A coffee maker comprising an infusion vessel, upper and lower perforated plates extending across the lower portion of the vessel and spaced apart for containing a mass of ground coffee, and an element for forming a space for receiving water for making the coffee beverage, said element being within the upper portion of the vessel and engaging a limited portion of the upper plate for permitting water to first pass into a limited portion of the coffee mass through a portion of the perforations of the upper plate for expelling gases from the coffee mass, said element being formed to permit an overflow of the water at the upper portion thereof and over the remaining portion of the perforated upper plate for causing the water to pass downwardly through the entire coffee mass.

2. A coffee maker comprising an infusion vessel, upper and lower perforated plates extending across the lower portion of the vessel and spaced apart for containing a mass of ground coffee, and a cylindrical element for receiving water for making the coffee beverage, said element being within the upper portion of the vessel and engaging a central limited portion of the upper plate for permitting water to first pass into a limited central portion of the coffee from said cylindrical element through a portion of the perforations of the upper plate for expelling gases from the coffee mass, said element being formed to permit an overflow of the water from the upper portion thereof into said vessel and over the remaining portion of the perforated upper plate for causing the water to pass downwardly through the entire coffee mass.

3. A coffee maker comprising an infusion vessel, upper and lower perforated plates extending across the lower portion of the vessel and spaced apart for containing a mass of ground coffee, and a cylindrical element forming a chamber for receiving water for making the coffee beverage, said element extending from the upper portion of the vessel to the lower portion of the vessel and passing within the upper plate and engaging the lower plate to form a space for receiving the mass of ground coffee between the lower portion of said element and said vessel, said element having perforations at the lower portion of said chamber opposite the mass of coffee for permitting water to pass therethrough and expel gases from the coffee mass, and said element having an over-flow opening at the upper portion of said chamber to permit water to overflow from said chamber and cover the upper perforated plate and thereby permit water to pass down through the whole coffee mass, the portion of said element between said perforations and the over-flow opening being impervious to passage of the water for forming a pressure head of water in the chamber for aiding said expelling of gases.

4. A coffee maker comprising a heating vessel and an infusion vessel removable therefrom and having a sealed joint between them, a central tube extending from the upper portion of the infusion vessel to near the bottom of the heating vessel, upper and lower perforated plates extending across the lower portion of the infusion vessel and surrounding said tube for containing a mass of ground coffee between them, and a cylindrical element surrounding the upper portion of said tube and spaced therefrom and engaging a portion of said upper plate for permitting water from the heating vessel to pass up through the tube and within said cylindrical element and through a portion of the perforations in the upper plate and into a portion of the coffee mass for expelling gases therefrom through perforations in the remaining portion of the upper plate, said cylindrical element being formed at its upper portion to permit water to overflow therefrom and thereby cover all of the coffee mass and pass downwardly through the coffee mass to the heating vessel.

5. A coffee maker comprising a heating vessel and an infusion vessel removable therefrom and having a sealed joint between them, a central tube extending from the upper portion of the infusion vessel to near the bottom of the heating vessel, upper and lower perforated plates extending across the lower portion of the infusion vessel and surrounding said tube for containing a mass of ground coffee between them, and a cylindrical element surrounding the upper portion of said tube and spaced therefrom and engaging a portion of said upper plate for permitting water from the heating vessel to pass up through the tube and within said cylindrical element and through a portion of the perforations in the upper plate and into a portion of the coffee mass for expelling gases therefrom through perforations in the remaining portion of the upper plate, there being a restricted opening below the lower plate communicating with the heating vessel, said cylindrical element being formed at its upper portion to permit water to overflow therefrom and thereby cover all of the coffee mass and pass downwardly through the coffee mass and through said opening to the heating vessel.

6. A coffee maker comprising a heating vessel and an infusion vessel removable therefrom and having a sealed joint between them, a central tube extending from the upper portion of the infusion vessel to near the bottom of the heating vessel, upper and lower perforated plates extending across the lower portion of the infusion vessel and surrounding said tube for containing a mass of ground coffee between them, and a cylindrical element surrounding the upper portion of said tube and spaced therefrom and engaging a portion of said upper plate for permitting water from the heating vessel to pass up through the tube and within said cylindrical element and through a portion of the perforations in the upper plate and into a portion of the coffee mass for expelling gases therefrom through perforations in the remaining portion of the upper plate, there being a restricted opening below the lower plate and through said tube, said cylindrical element being formed at its upper portion to permit water to overflow therefrom and thereby cover all of the coffee mass and pass downwardly through the coffee mass and through said opening to the heating vessel.

7. A coffee maker comprising a heating vessel and an infusion vessel removable therefrom and having a sealed joint between them, a central tube extending from the upper portion of the infusion vessel to near the bottom of the heating vessel, upper and lower perforated plates extending across the lower portion of the infusion vessel and surrounding said tube for containing a mass of ground coffee between them, a one-way valve at the top of said tube permitting passage of water out through the top of the tube, and a cylindrical element surrounding the upper portion of said tube and spaced therefrom and engaging a portion of said upper plate for permitting water from the heating vessel to pass up through the tube and within said cylindrical element and through a portion of the perforations in the upper plate and into a portion of the coffee mass for expelling gases therefrom through perforations in the remaining portion of the upper plate, said cylindrical element being formed at its upper portion to permit water to overflow therefrom and thereby cover all of the coffee mass and pass downwardly through the coffee mass to the heating vessel.

8. A coffee maker comprising a heating vessel and an infusion vessel removable therefrom and having a sealed joint between them, a central tube extending from the upper portion of the infusion vessel to near the bottom of the heating vessel, a lower plate extending across the lower portion of the infusion vessel and surrounding said tube, a cylindrical element surrounding the upper portion of the tube and spaced therefrom and engaging a central portion of the lower plate, said lower plate having perforations in its portion between said cylindrical element and the wall of the infusion vessel, and an upper perforated plate extending from said element to the wall of the infusion vessel and spaced from the lower plate for containing a mass of ground coffee between them, said cylindrical element having perforations in its lower portion for permitting water to pass therefrom into the coffee mass, said cylindrical element being formed at its upper portion to permit water to overflow therefrom and thereby cover the coffee mass and pass downwardly through the coffee mass to the heating vessel.

9. A coffee maker comprising a heating vessel and an infusion vessel removable therefrom and having a sealed joint between them, a central tube extending from the upper portion of the infusion vessel to near the bottom of the heating vessel, a lower plate extending across the lower portion of the infusion vessel and surrounding said tube, a cylindrical element surrounding the upper portion of the tube and spaced therefrom and engaging a central portion of the lower plate, said lower plate having perforations in its portion between said cylindrical element and the wall of the infusion vessel, and an upper perforated plate extending from said element to the wall of the infusion vessel and spaced from the lower plate for containing a mass of ground coffee between them, there being a restricted opening below the lower plate communicating with the heating vessel, said cylindrical element having perforations in its lower portion for permitting water to pass therefrom into the coffee mass, said cylindrical element being formed at its upper portion to permit water to overflow therefrom and thereby cover the coffee mass and pass downwardly through the coffee mass and through said opening to the heating vessel.

10. A coffee maker comprising an infusion vessel, pervious means in the lower portion of the vessel for forming a space for retaining a mass of ground coffee, and an element engaging said means and extending above said means and forming a chamber for receiving water, there being small openings connecting the lower portion of said chamber with a limited portion of said space for passing the water from said chamber to a limited portion of the coffee mass for expelling gases therefrom by the water spreading through other portions of the mass, said element having an over-flow opening at the upper portion of said chamber to permit an over-flow of the water from said chamber and over the top of said means thereby causing the water to pass downwardly through the entire coffee mass, the portion of said element between said small openings and the over-flow opening being impervious to passage of the water for forming a pressure head of water in the chamber for aiding said expelling of gases.

11. A coffee maker comprising a heating vessel and an infusion vessel removable therefrom and having a sealed joint between them, a central tube extending from the upper portion of the infusion vessel to near the bottom of the heating vessel, pervious means in the lower portion of the infusion vessel for forming a space for retaining a mass of ground coffee, and an element engaging said means and extending above said means and forming a chamber for receiving water from said tube, there being small openings connecting the lower portion of said chamber with a limited portion of said space for passing the water from said chamber to a limited portion of the coffee mass for expelling gases therefrom by the water spreading through other portions of the mass, said element having an over-flow opening at the upper portion of said chamber to permit an over-flow of the water from said chamber and over the top of said means thereby causing the water to pass downwardly through the entire coffee mass, the portion of said element between said small openings and the over-flow opening being impervious to passage of the water for forming a pressure head of water in the chamber for aiding said expelling of gases.

12. A coffee maker comprising a heating vessel and an infusion vessel removable therefrom and having a sealed joint between them, a central tube extending from the upper portion of the infusion vessel to near the bottom of the heating vessel, pervious means in the lower portion of the infusion vessel for forming a space for retaining a mass of ground coffee, and an element engaging said means and extending above said means and forming a chamber for receiving water from said tube, there being small openings connecting the lower portion of said chamber with a limited portion of said space for passing the water from said chamber to a limited portion of the coffee mass for expelling gases therefrom by the water spreading through other portions of the mass, said element having an over-flow opening at the upper portion of said chamber to permit an over-flow of the water from said chamber and over the top of said means thereby causing the water to pass downwardly through the entire coffee mass, the portion of said element between said small openings and the over-flow opening being impervious to passage of the water for forming a pressure head of water in the chamber for aiding said expelling of gases, there being a restricted opening below said means communicating with said heating vessel.

13. A coffee maker comprising an infusion vessel, upper and lower perforated plates in the lower portion of the vessel for forming a space between the plates for retaining a mass of ground coffee, and an element extending above the plates and forming a chamber for receiving water, there being small openings connecting the lower portion of said chamber with a limited portion of said space for passing the water from said chamber to a limited portion of the coffee mass for expelling gases therefrom by the water spreading through other portions of the mass, said element having an over-flow opening at the upper portion of said chamber to permit an over-flow of the water from said chamber and over the upper plate thereby causing the water to pass downwardly through the entire coffee mass, the portion of said element between said small openings and the over-flow opening being impervious to passage of the water for forming a pressure head of water in the chamber for aiding said expelling of gases.

JOSEPH L. KOPF.